US00RE40629E

(19) United States
(12) Reissued Patent
Konno et al.

(10) Patent Number: US RE40,629 E
(45) Date of Reissued Patent: Jan. 27, 2009

(54) MULTI-FUNCTION IMAGE FORMING APPARATUS WITH IMAGE PRIORITIZATION SCHEME

(75) Inventors: Miki Konno, Kanagawa-ken (JP); Yoji Matsuda, Kanagawa-ken (JP)

(73) Assignee: Toshiba Tec Kabushiki Kaisha, Tokyo (JP)

(21) Appl. No.: 10/845,621

(22) Filed: May 13, 2004

Related U.S. Patent Documents

Reissue of:
(64) Patent No.: 6,389,248
Issued: May 14, 2002
Appl. No.: 09/649,009
Filed: Aug. 28, 2000

(30) Foreign Application Priority Data

Sep. 8, 1999 (JP) ..... 11-254475

(51) Int. Cl.
*G03G 15/00* (2006.01)

(52) U.S. Cl. ..... 399/81; 399/87

(58) Field of Classification Search ..... 358/296, 358/468; 399/77, 81–83, 85, 87
See application file for complete search history.

(56) References Cited

U.S. PATENT DOCUMENTS 5,377,016 A * 12/1994 Kashiwagi et al. ..... 358/403
5,565,964 A * 10/1996 Tashiro et al. ..... 399/83
5,729,791 A * 3/1998 Kutsuwada et al. ..... 399/82
6,026,258 A * 2/2000 Fresk et al. ..... 399/87

FOREIGN PATENT DOCUMENTS

EP 0774710 * 5/1997
EP 0814424 * 12/1997
GB 2349767 * 8/2000

* cited by examiner

*Primary Examiner*—Hoang Ngo
(74) *Attorney, Agent, or Firm*—Foley & Lardner LLP

(57) ABSTRACT

A printer controller receives a printer job from external equipment and carries out the printer job using a printer. A user IF task accepts a reservation input for the use of a copying function using a scanner and the printer from a user while the printer job is being executed by the printer controller. Responsive to the copy reservation input, a job management task reserves the right of use of the scanner and the printer after the completion of the printer job in execution. If the printer is in operation when the user desires to use the copy function, the user is allowed to make a reservation for copying and then copy after the termination of the current printer job even if another printer job has been spooled.

28 Claims, 8 Drawing Sheets

| | |
|---|---|
| SCANNER RESOURCES | Rs |
| PRINTER RESOURCES | Rp |

0 : UNUSED
1 : USED BY PRINTER CONTROLLER
2 : USED BY JOB MANAGEMENT TASK

| | |
|---|---|
| SCANNER RESOURCES | Rs |
| PRINTER RESOURCES | Rp |

0 : UNUSED

1 : USED BY PRINTER CONTROLLER

2 : USED BY JOB MANAGEMENT TASK

MULTI-FUNCTION IMAGE FORMING APPARATUS WITH IMAGE PRIORITIZATION SCHEME

Matter enclosed in heavy brackets [ ] appears in the original patent but forms no part of this reissue specification; matter printed in italics indicates the additions made by reissue.

CROSS-REFERENCE TO RELATED APPLICATIONS

This application is based upon and claims the benefit of priority from the prior Japanese Patent Application No. 11-254475, filed Sep. 8, 1999, the entire contents of which are incorporated herein by reference.

BACKGROUND OF THE INVENTION

The present invention relates to an image formation apparatus having at least copy and printer functions.

The recent advance of digital technology and LAN environments have allowed copying machines to be frequently used as image handling apparatuses which, in addition to a copy function, provide a scanner function and a printer function (i.e., a function of printing characters corresponding to input character code data).

Unlike the copy function in which the user has to directly operate the copying machine, in the printer function, data to be printed are transferred over a LAN or the like to the copying machine and then printed. For this reason, a job spooling facility which is not required with conventional copying machines, i.e., a facility for temporarily saving data to be printed, has become essential.

Thus, when a printer job has been spooled, the user has to wait at the side of the copying machine until the spooled printer job is completed, which may degrade the operability of the copy function.

A conventional interrupt facility adapted to prevent such a situation can force the printer job to be suspended for printing. For example, if an interruption is caused when the 25-th page of 50 pages of printer job is being printed, then copying will be made possible at the termination of printing of the 25-th page.

However, when a printer job is carried out using a sorter facility, a limitation is encountered in specifying receiving (exit) trays of the sorter at copy time. That is, when sheets of paper printed by the printer job have been sorted into some trays of the sorter, sheets copied by copying operation have to be delivered to unused trays in order to prevent the copies from being delivered to the same trays as the printed sheets have been delivered. Therefore, a problem arises in that is it impossible to perform the copying function using the sorter facility.

On the other hand, the user who has directed the machine to perform a printer job will also suffer inconvenience because the printer job in execution may be suspended for a long time by an interruption caused by another user.

BRIEF SUMMARY OF THE INVENTION

A first object of the present invention is to provide an image formation apparatus having built-in copying and printing functions which permits the waiting time until copying becomes enabled to be reduced even if, when a user desires to use the copying function, the printer is in operation and multiple printer jobs have been spooled.

When a copy reservation function which allows copying to be performed with certainty after the execution of the current printer job is built in the apparatus to reduce the waiting time for copying, a problem may arise in the case where the amount of printing by the current printer job in execution is large. That is, in the event that the user makes a copy reservation on the apparatus, then leaves the apparatus and returns to the apparatus with a delay, a situation occurs where the apparatus is not in operation though print data has been spooled, reducing the printing efficiency. It is therefore a second object of the present invention to provide an image formation apparatus which prevents the copy reservation function from stopping a printer job longer than is necessary.

If, in order to prevent the printer job from being stopped longer than is necessary, an autoclear function is put into operation to automatically cancel the copy reservation, there arises the possibility that, if the user who has made a copy reservation leaves the apparatus and returns to the apparatus with some delay, the copy reservation may have been canceled against his or her will, reducing the operability of the copying function. It is therefore a third object of the present invention to provide an image formation apparatus which prevents a copy reservation from being canceled against user's will.

If a desired size of paper is not set in the apparatus when it is placed in the copy enabled state, there arises the possibility that the apparatus may have been used by a printer job when desired paper is replenished, in which case the user is not able to copy. It is therefore a fourth object of the present invention to provide an image formation apparatus which has no such a drawback.

In addition, a fifth object of the present invention is to provide an image formation apparatus which permits efficient control of power consumption when the copy reservation function is implemented.

The present invention includes a copy reservation function using an interrupt approach which places the copying machine in the copy enabled state after the completion of a printer job in execution rather than interrupting the printer job immediately when a request for copying occurs.

According to an aspect of the present invention, there is provided an image formation apparatus comprising: image formation means for forming an image corresponding to input image data; printer job control means having means for receiving a printer job from external equipment, means for holding a plurality of received printer jobs, means for providing first image data corresponding to a printer job and means for printing an image corresponding to the first image data using the image formation means; original reading means for optically reading the image of an original to provide second image data; user interface means for accepting from a user a copy job start input and a copy reservation input for, when the image formation means is being used by the printer control means, making a reservation for the use of a copying function provided by the image formation means and the original reading means after the completion of a printer job in execution; copy job management means including means responsive to the copy job input to the user interface means for copying the original image using the original reading means and the image formation means, and copy reservation means responsive to the copy reservation input to the user interface means for reserving the use of the copying function after the completion of the printer job in execution.

The copy reservation facility of the present invention allows the user to copy using the image formation apparatus after the completion of the current printer job is execution even if another printer job has been spooled. Thus, the first object of the invention is achieved.

The copy job management means includes means for inhibiting the execution of a printer job, even if it has occurred, for a first predetermined period of time since the image formation means was made available owing to a copy reservation through the copy reservation means or for a second predetermined period of time since the user interface means accepted the key inputs at least once even if that printer job has occurred within the first predetermined period of time.

That is, the execution of a printer job is rendered possible when the first predetermined period of time elapses since the image formation means was made available or when the second predetermined period of time elapses since the user made at least one copy within the first period of time. The copy reservation facility therefore permits a printer job to be prevented from being stopped longer than is necessary. In addition, the copy reservation facility permits a copy reservation from being canceled even if the user returns to the copying machine with some delay because a printer job cannot be put into execution for some time since the copying function was made available. Thus, the second and third objects of the present invention are achieved.

The copy job management means includes printer job inhibit means responsive to an input to the user interface means when the apparatus has been placed in the copy executable state for inhibiting the execution of a printer job by the printer job control means, and the user interface means includes printer job inhibit input means for inhibiting the execution of a printer job.

The user is allowed to inhibit the execution of a print job by the printer job control means through the printer job inhibit input means provided in the user interface means. Thus, the fourth object of the present invention is achieved.

The copy job management means includes power saving means for reducing power consumption of the apparatus by placing the apparatus in the preheated state or power-off state when an additional time elapses after a lapse of the second predetermined period of time.

That is, the present apparatus is placed in the preheated state or power-off state when a time interval of the second period of time plus the additional time elapses since the image formation apparatus was made available owing to a copy reservation and the user operated a key. In other words, the apparatus is not placed in the preheated state unless the user performs at least one key operation since the apparatus was made available owing to a copy reservation. Therefore, even if the user who has made a copy reservation returns to the copying machine with a delay and the reservation have thus been canceled, the user does not have to wait for the apparatus to return from the preheated state. Moreover, it becomes possible to control power consumption in an efficient manner. Thus, the fifth object of the present invention is achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiments of the present invention will be described in detail below with reference to the accompanying drawings.

Figure 1:
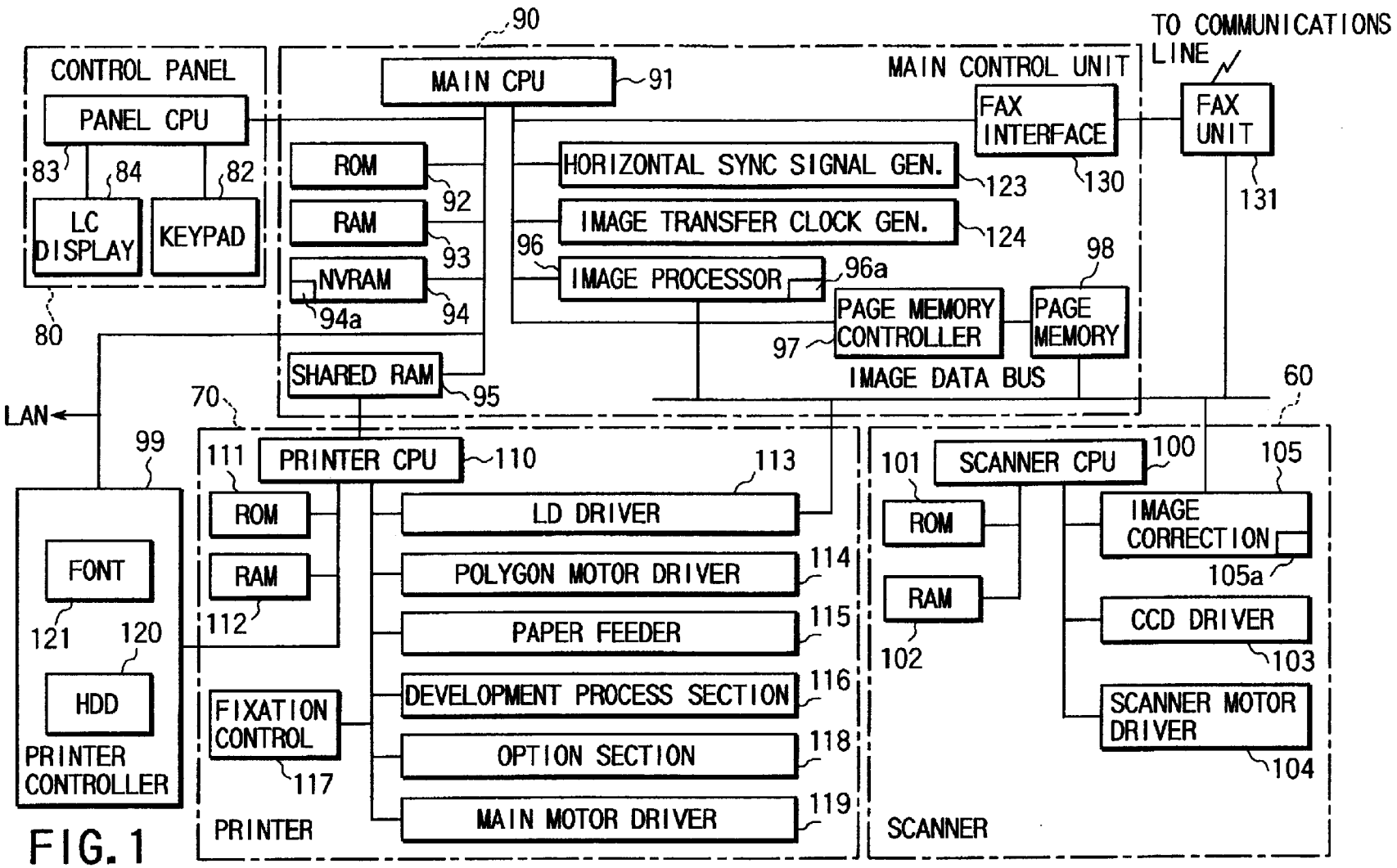
FIG. 1 is a block diagram of a control system used in a digital copying machine to which the principles of the present invention are applied.

Referring now to FIG. 1, there is illustrated in block diagram form a control system used in a digital copying machine to which the principles of the present invention are applied.

The digital copying machine is roughly constructed from a main control unit 90 subject to the control by a main CPU 91, a scanner unit 60 subject to the control by a scanner CPU 100, a printer unit 70 subject to the control by a printer CPU 110, and a control panel 80 subject to the control by a panel CPU 83.

The printer CPU 110 and the scanner CPU 100 make serial communications with each other. The printer CPU 110 sends operation instructions and the scanner CPU 100 returns statuses. Where a fax function is incorporated as an option, a fax unit 131 is connected to the main CPU 91 through a fax interface 130.

The main control unit 90 includes the main CPU 91, a ROM 92, a RAM 93, an NVRAM 94, a shared RAM 95, an image processing section 86, a page memory controller 97, a page memory 98, a horizontal sync signal generator 123, an image transfer clock generator 124, and the fax interface 130.

The main CPU 91 controls the entire main control unit. The ROM 92 is stored with various control programs. The RAM 93 temporarily stores data.

The NVRAM (nonvolatile RAM) 94, which is a battery backup nonvolatile memory, retains stored data when power is switched off. The NVRAM has a table area 94a which stores an initial setting table of default values for hardware elements constituting copy resources and FAX resources and flags for nullifying autoclear during the occurrence of errors. The shared RAM 95 is used for two-way communications between the main CPU 91 and the printer CPU 110. The main CPU 91 is connected to a LAN as well.

The image processing section 96 comprises image processing circuitry and a line memory 96a and stores image data subjected to image processing, such as trimming, masking, compression, expansion, etc., into the line memory.

The horizontal sync signal generator 123 generates a horizontal sync signal synchronized with the rotation of a polygon mirror (not shown). The image transfer clock generator 124 generates an image transfer clock signal to control the timing of transfer of image data.

The page memory controller 97 stores or reads image data into or from the page memory 98. The page memory has an area adapted to store multiple pages of image data and is arranged to compress input image data from the scanner 60 or the printer controller 99 and store compressed image data for each page.

The printer controller 99 receives code data, such as character codes, from external equipment, such as a personal computer, over the LAN. The printer controller creates image data (images composed of dots) corresponding to code data using font data stored in a printer font ROM 121 and stores it on a hard disk in a hard disk driver HDD 120. In this case, the printer controller creates the image data in a size and at a resolution represented by character size and resolution data appended to the code data.

In printing documents based on code data externally received over the LAN, the printer controller 99 inquires of the CPU 91 via the printer CPU 110 as to the right of use of the printer 70 and carries out printing only when the right of use can be acquired.

The printer unit 70 includes the printer CPU 110 for controlling the entire printer, a ROM 111 stored with control programs, a RAM 112 for storing data, an LD driver 113 for on-off control of light emission from a semiconductor laser, a polygon motor driver 114 for controlling the rotation of a polygon motot in a laser unit, a paper carry section 115, a development processing section 116, a fixation section 117, an option section 118, and a main motor driver 119.

The paper carry section 115 controls the carry of paper by paper carry means. The development processing section 116 performs charging, development and transfer using a charger, development equipment, a transfer charger, etc. The fixation control section 117 controls fixing equipment. The main motor driver 119 controls the rotation of a main motor (photosensitive drum motor) and the option section 118. The main motor driver 119 has a main motor control IC and generates a motor driving frequency signal according to the frequency of a reference clock signal applied from the main CPU 91 to that control IC to thereby control the number of rotations of the main motor.

The polygon motor driver 114 has a polygon motor control IC and generates a motor driving frequency signal according to the frequency of the reference clock signal applied to that control IC to thereby control the number of rotations of the polygon mirror motor.

The scanner 60 includes the scanner CPU 100, a ROM 101, a RAM 102, a CCD driver 103, a scanner motor driver 104, and an image correction section 105. The scanner CPU controls the entire scanner. The ROM stores control programs, etc. The RAM 102 is used to store data temporarily. The CCD driver 103 drives a CCD sensor. The scanner motor driver 104 controls the rotation of a carriage motor that moves an original reading carriage composed of an exposure lamp, a mirror, etc.

The image correction section 105 includes an A/D converter for converting analog signals from the CCD sensor into digital signals, a shading correction circuit for compensating for level variations in CCD sensor output signal due to variations in characteristics of CCD sensor elements or ambient temperature changes, and a gamma correction circuit. The image correction section further includes a line memory 105a for temporarily storing compensated digital signals from the correction circuits. The scanner further includes an exposure lamp controller for controlling the exposure lamp and a driver for driving a moving mechanism for moving an image-formation lens to the position where a set magnification is achieved.

The fax unit 131 receives fax data consisting of compressed bit-mapped data externally sent over a communication line such as a public line, expands it into image data, and outputs it to the main control unit 90 over the fax interface 130. The fax unit also compresses image data input over the fax interface 130 and sends it over the communications line.

Figures 2A, 2B:
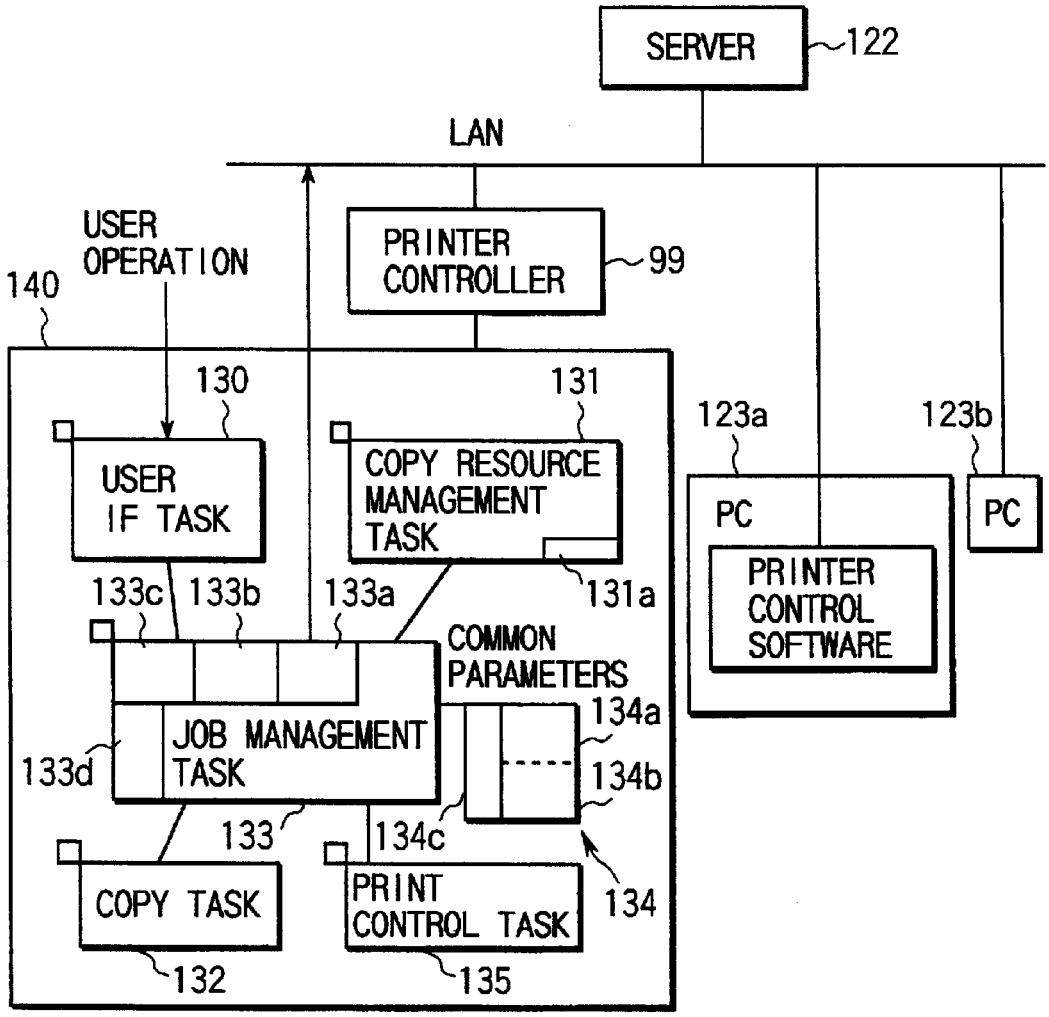
FIG. 2A is a block diagram of a task configuration according to a first embodiment of the present invention which is applied to the digital copying machine of FIG. 1.
FIG. 2B shows in detail the contents of the resource table of FIG. 2A.

The copy reservation function of the present invention will be described next. FIG. 2A is a block diagram of a task configuration of the present invention which is applied to the digital copying machine arranged as described above.

In the equipment for practicing the invention, the copy function and the printer function are implemented in such a task configuration as shown at 140 in FIG. 2A. The task configuration is stored in the ROM 92 and loaded into the RAM 93 after the power to the apparatus has been turned on.

A user IF task shown in FIG. 2A presents to a job management task 133 information as to which key has been depressed on the control panel 80 (key depression information) and allows necessary information, such as a screen for copy operations, error contents, etc., to appear on the control panel 80.

The printer controller 99 acquires a right of use of printer resources from a copy resource management task 131 and performs the print function using printer resource control means such as the printer CPU 110, etc. Here, "resources" refer to pieces of hardware necessary to carry out a job such as a printer job or a scanner job. For example, the printer resources refer to the printer unit 70 including the photosensitive drum, laser exposure unit, development unit, paper carrying unit, etc. In this apparatus, the printer controller 99 and the job management task 133 are connected to the LAN. The printer controller 99 obtains print data from external equipment, such as a personal computer, that is connected to the LAN.

The job management task 133 makes communications with the printer controller 99 to acquire information (the paper size, the number of sheets, the location (trays) to which printer paper is directed, etc.) concerning a printer job currently in execution. The job management task 133 controls a job relating to copying and, on acquisition of a right of use of the copying resources (including the printer resources and the scanner resources), performs requested copy processing using copying resource control means, such as the printer CPU 110 and the scanner CPU 100.

Figure 3:
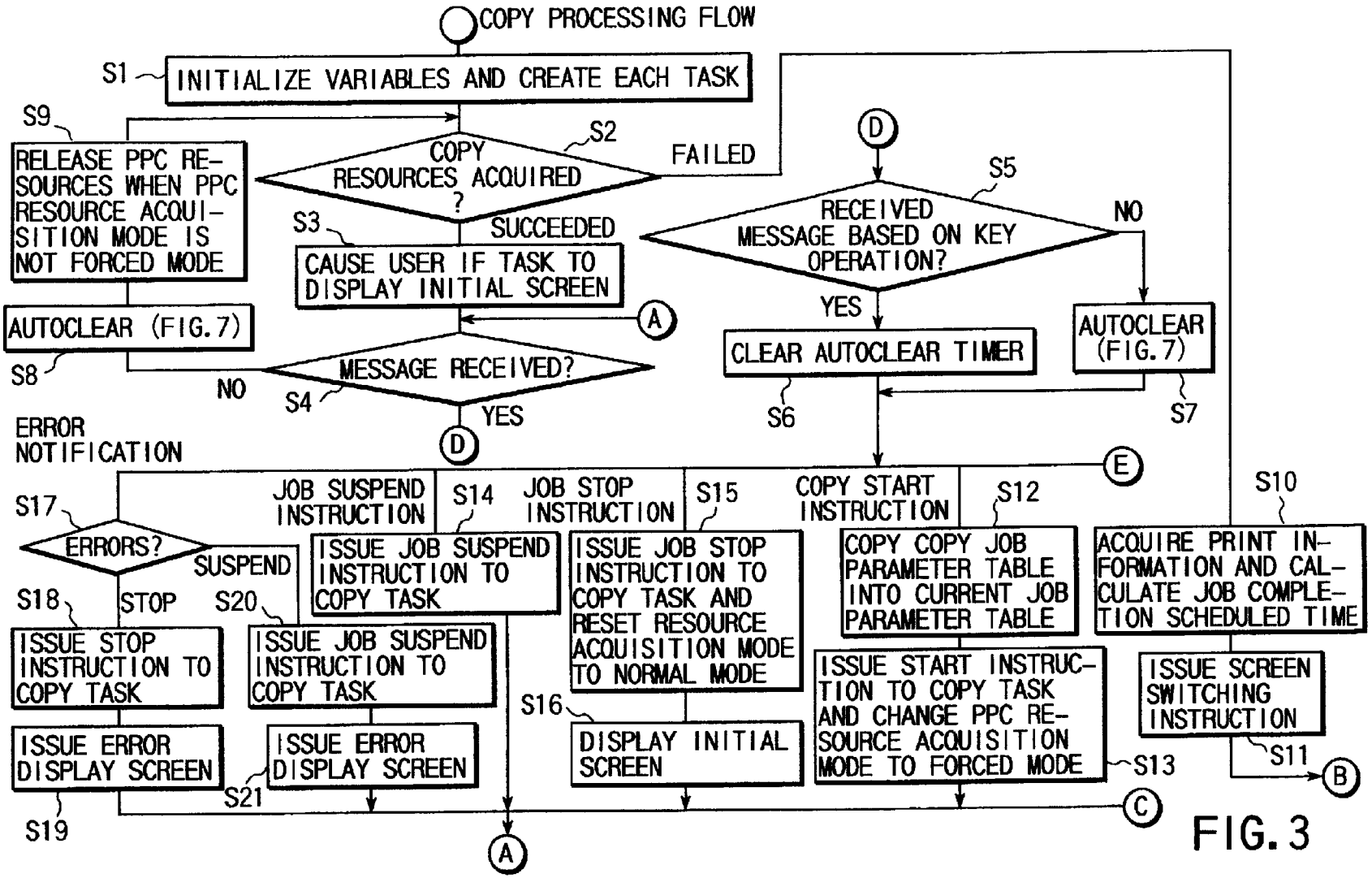
FIG. 3 is a first flowchart for the copy processing of the present invention.

Reference is next made to FIG. 3 to give an outline of the copy processing flow. When the power is turned on, the job management task 133 is loaded from the ROM 92 into the RAM 93, so that internal variables are initialized and tasks configured as shown in FIG. 2A are created (step S1).

In the present apparatus, since the printer controller 99 and the job management task 133 are independent of each other, which of the copy and print functions becomes effective depends on which function has acquired the right of use of the copying resources. The job management task 133 thus makes an attempt to acquire the copying resources.

The copying resource management task 131 is provided with such a resource acquisition table 131a as shown in FIG. 2B. When the current value Rs for scanner resources is "0", the scanner is on standby. When Rs="1", the scanner is being used by the printer controller 99. When Rs=2, it is being used by the job management task 133. The same holds for the printer resources.

For example, upon entry of a printer job from external equipment, the printer controller 99 spools it on the hard disk 120. The printer controller makes sure that the current value Rp for printer resources is "0", then sets the current value Rp to "1" and executes the printer job spooled on the hard disk 120. At the termination of the execution of the job, the printer controller resets the current value Rp to"0".

Referring back to FIG. 3, the job management task 133 determines a success in acquiring the copying resources by confirming that both the current values Rs and Rp for scanner and printer resources of FIG. 2B are "0" and setting the current values Rs and Rp to 2. The job management task 133 on success in acquiring the copying resource in step S2 causes the user IF task 130 to display the initial screen (step S3). At this point, such a screen as shown in (e) of FIG. 9 appears.

Figure 4:
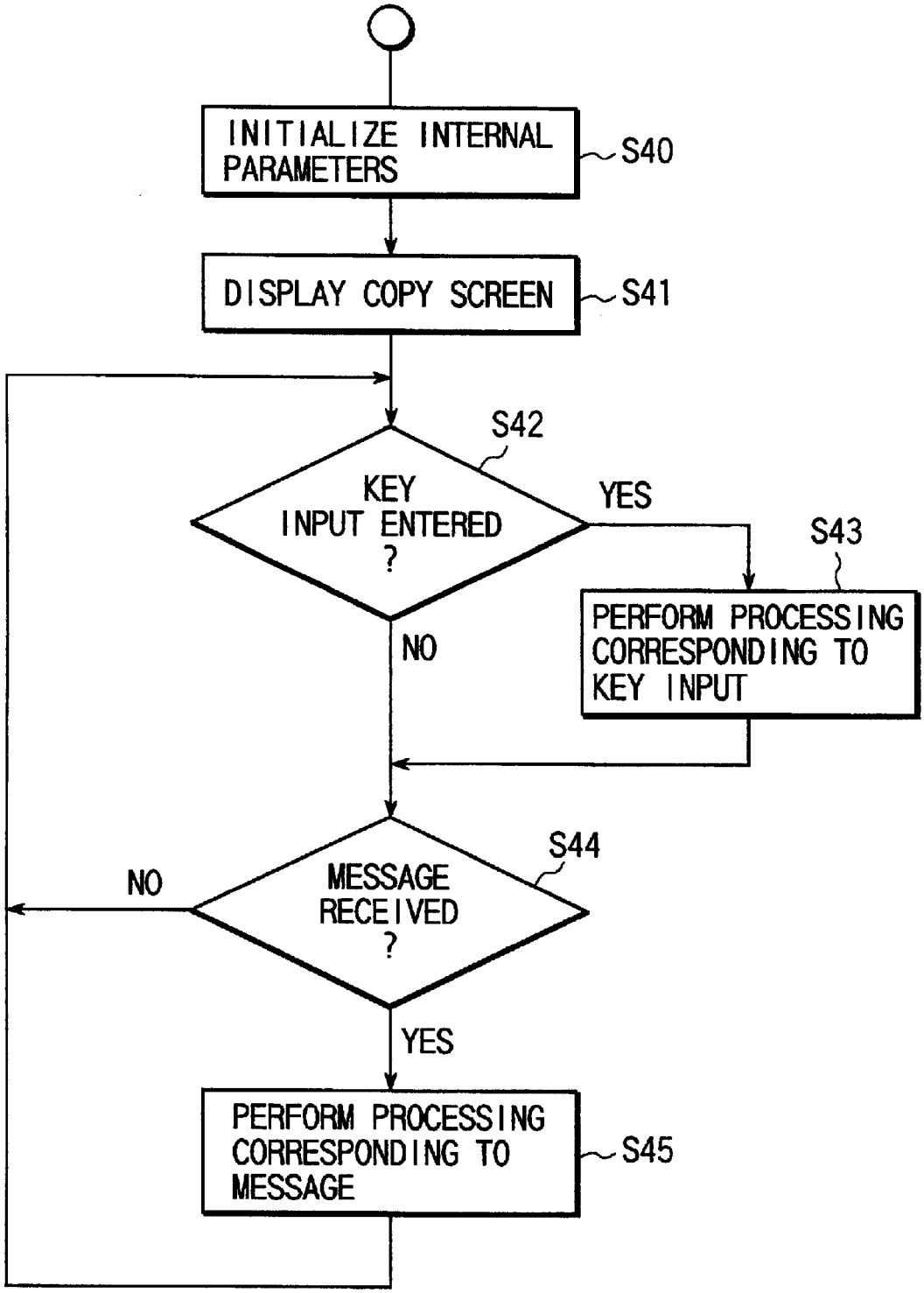
FIG. 4 is a flowchart for the user IF task of FIG. 2A.

FIG. 4 is a flowchart for the processing operation of the user IF task. The user IF task 130 initializes internal parameters of the control panel 80 and then causes a default screen to appear on the display section 84 (step S41). The default screen is such a copying screen as shown in (e) of FIG. 9. Also, the user IF task 130 makes a decision of the presence or absence of key entry by the user from the keypad 82. In the presence of key entry, the corresponding processing is performed (step S43). The processing corresponding to the key entry includes sending of data corresponding to the key entry to the job management task 133 and switching of display screens. The key data entered into the job management task 133 is stored in a message queue 133c (see FIG. 2A). The user IF task 130 also makes a decision of the presence or absence of a message, such as a display switching instruction or an error contents display instruction, from the job management task 133. In the presence of such a message, the corresponding processing is performed (step S45).

In step S4 of FIG. 4, copying has been made possible; thus, the job management task 133 checks the message queue 133c. If a message has been entered, then a decision is made as to whether or not that message is originated from a key operation by the user (step S5). In the case of key operation, an autoclear timer that measures the interval to the time when the autoclear function is performed is cleared (step S6); otherwise, the procedure goes to the process flow of FIG. 7 which will be described later. In step S6, the autoclear timer starts counting from"0".

When the user sets paper size, density, and the like on the Copy screen of the control panel, the settings are recorded on a copy job parameter table by the user IF task 130. When a copy start key is depressed, the user IF task 130 issues to the job management task 133 a copy starting instruction, which is entered into the message queue 133c of the job management task 133.

The job management task 133 copies the contents of the copy job parameter table 134a into a current job parameter table 134b (step S12). The job management task then issues a copy starting instruction to the copy task 132 and changes the copy resource acquisition mode 133b to the forced mode (step S13).

The copy task 132 performs copying on the basis of the contents of the current parameter table 134b and, upon completion, issues a job completion message to the job management task 133. The job management task receives that message via, the message queue 133c, sets the PPS resource acquisition mode to the normal mode, and allows the Initial screen to appear on the conrol panel (steps S47 and S48).

When nothing is found in the message queues 133c in step S4, the job management task 133 releases the acquired right of use of the copying resources (when the copying resource acquisition mode has been set to the normal mode), i.e., resets both the current values for the scanner and printer resources shown in FIG. 2B to "0" and then makes an attempt to acquire the copying resources again. In the case of success, the job management task 133 checks the message queue 133c (step S4). The job management task 133 repeats such processes.

In the event that the job management task 133 has failed to acquire the copying resources in step S2, namely, when the current value Rp in the resource acquisition table of FIG. 2B is "1", the printer controller 99 is using the printer resources and the job management task 133 thus makes communications with the printer controller 99 to capture print information, such as the paper size, the number of sheets to be printer, the trays to which printed sheets are discharged, etc., and then calculates the print job completion scheduled time on the basis of the equation below completion scheduled time=current time+time required to feed a sheet of paper from the tray to the regist roller and from the regist roller to a sheet discharge portion+time required to discharge the sheet+feed time difference between the sheet=(number of sheets to be printed=1) (1)

Figure 5:
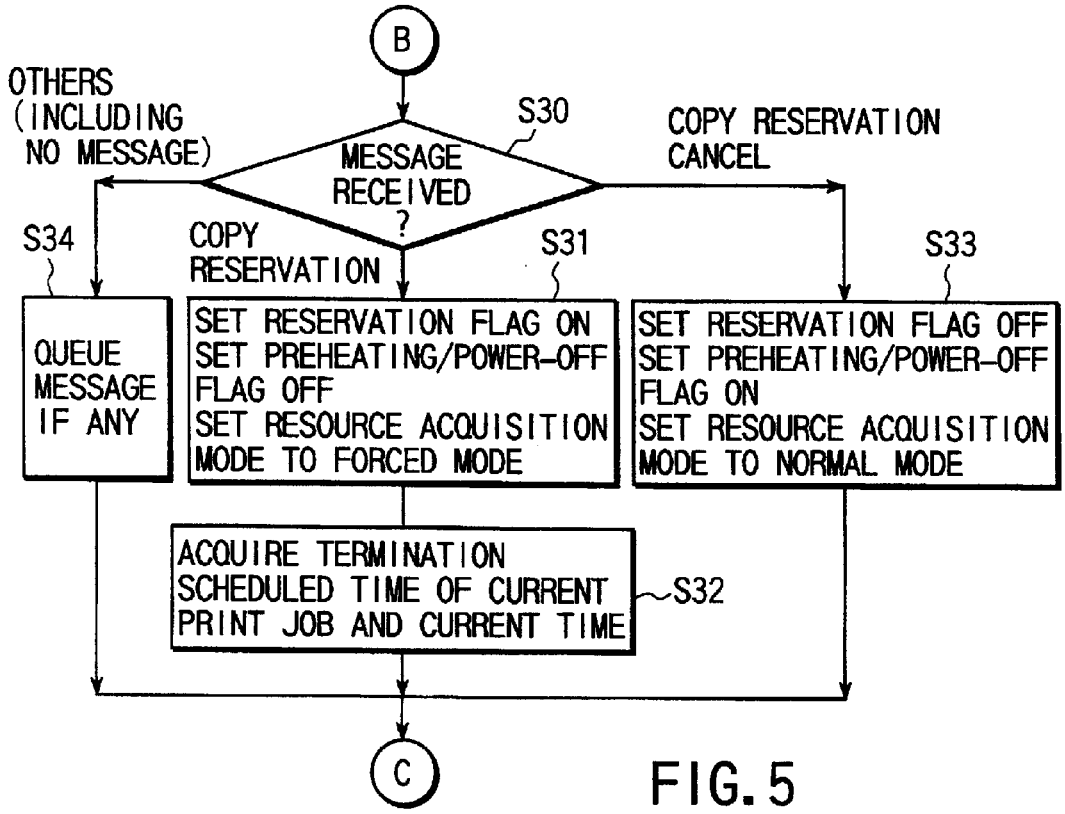
FIG. 5 is a second flowchart for the copy processing of the present invention.

The job management task 133 instructs the user IF task 130 to display the result of the calculation on the control panel 80 (step S11). At this point, such a screen as shown in (a) of FIG. 9 appears on the liquid crystal display 84 of the control panel 80. After that, the procedure goes to step S30 in FIG. 5. In the absence of any message, the job management task 133 repeats the process flow of FIG. 3 to make an attempt to acquire the copying resources.

Upon receipt of a job suspending instruction based on the depression of the interruption key or the stop key from the user IF task 130, or a job canceling instruction or error information from the print control task 135, the job management task 133 suspends, cancels or deletes the current job as indicted in steps S14 through S21.

The processing operation of the job management task associted with copy reservation using the apparatus described so far will be described in detail below.

If two or more jobs have been spooled via the network, then the printer controller 99 temporarily releases the printer resources at job switching time, (that is, resets the current value Rp for the printer resources to "0") and then makes an attempt to acquire the printer resources again after a relatively short time. Therefore, once the printer controller 99 acquires the printer resources, the job management task 133 is allowed to acquire the copying resources (particularly the printer resources) only at a job break. For this reason, the user who has come to the copying machine for printing purpose is not able to copy immediately when a printer job is in execution and has therefore to stand by until the termination of the current printer job.

To obviate such an inconvenience as arises when a request for copying occurs during the execution of a printer job, therefore, the present invention provides a function of reserving the copying resources. By the user clicking a copy reservation button 11 within the control screen shown in (a) of FIG. 9 during printer job execution, a copy reservation directing message is issued from the user IF task 130 to the job management task. As indicated in step S31 of FIG. 5, the job management task 134 then sets ON a reservation flag 133a which is an internal parameter, turns OFF a preheating/power-off parameter 134c set in common parameters 134, and sets the copying resource acquisition mode 133b to the forced mode. Moreover, the job management task 133 acquires the termination scheduled time of the current printer job and the current time and then displays them on the display 84 (step S32).

The job management task 133 makes repeated attempts to acquire the copying resources (the printer resources and the scanner resources) (step S2) and succeeds in acquiring the resources after the termination of the printer job. Since the copying resource acquisition mode 133b has been set to the forced mode, the printer controller 99 can not acquire the printer resources again immediately after the transmission of the current printer job. This is because the copying (PPC) resources are not released by the job management task 133 in step S9. Thus, in the case of success in acquiring the resources after the termination of the printer job, the copy reservation function of the present invention does not release the acquired resources until the printer job terminates or the autoclear function works.

Figure 9:
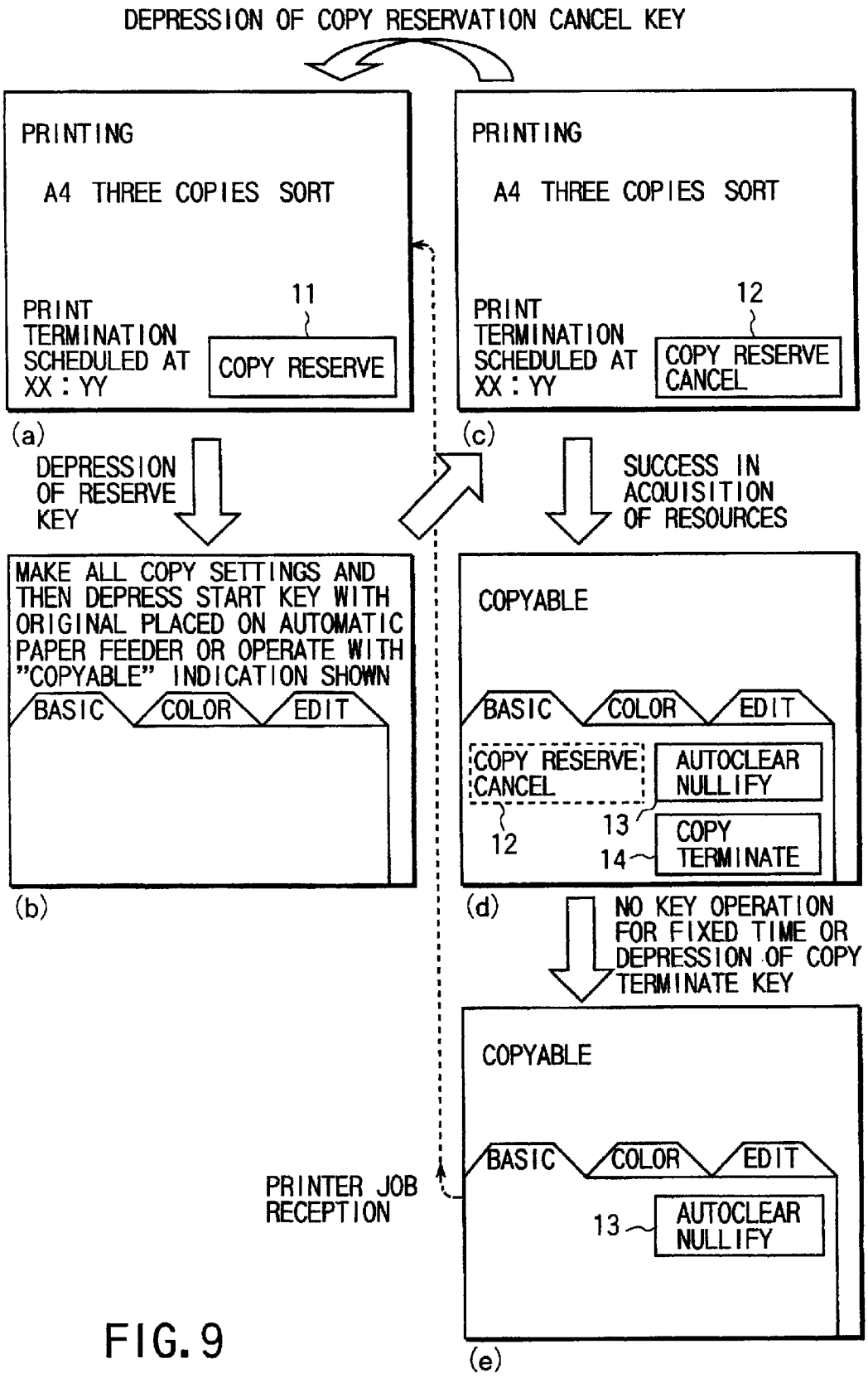
FIG. 9 shows various screen images for the copying reservation of the present invention displayed on the control panel.

The copy reservation function can be canceled by clicking a copy reservation cancel button 12 displayed within such a display screen as shown in (c) of FIG. 9 during copy function reservation. This is achieved by the job management task 133, upon receiving the copy reservation canceling message, resetting the flag which has been set at copy reservation time.

If, during the copy reservation, the time between the release and the reacquisition of the printer resources by the printer controller 99 is very short, there WILL arise the possibility that the job management task 133 fails to acquire the printer resources at a printer job break and the printer controller requires the printer resources. In view of this problem, a message to the effect that the job management task 133 will make forced copying resource acquisition when a reservation for copying has been made has been entered beforehand into the nonvolatile memory 94. At power-on time, the printer controller 99 reads the message and does not make resource acquisition for, e.g., 10 seconds after releasing the resources, when the forced resource acquisition mode had been set. Alteratively, after the lapse of a fixed time from copy reservation the job management task 133 may instruct the printer controller 99 through the printer CPU 110 to place a wait time of, for example, 30 seconds between the time of release and the time of acquisition of the copying resources. Such a fixed time can also be set beforehand in the nonvolatile memory 94.

Copying machines are provided with a function, normally referred to as the autoclear function, of clearing all settings so far when the user does not touch the control panel 80 for a fixed time. In the inventive apparatus in which the printer controller 99 and the job management task 133 compete for use of the copying resources, the copy resources are released at the time of autoclear when no copying is performed though a reservation for copying has been made by the user.

Figure 7:
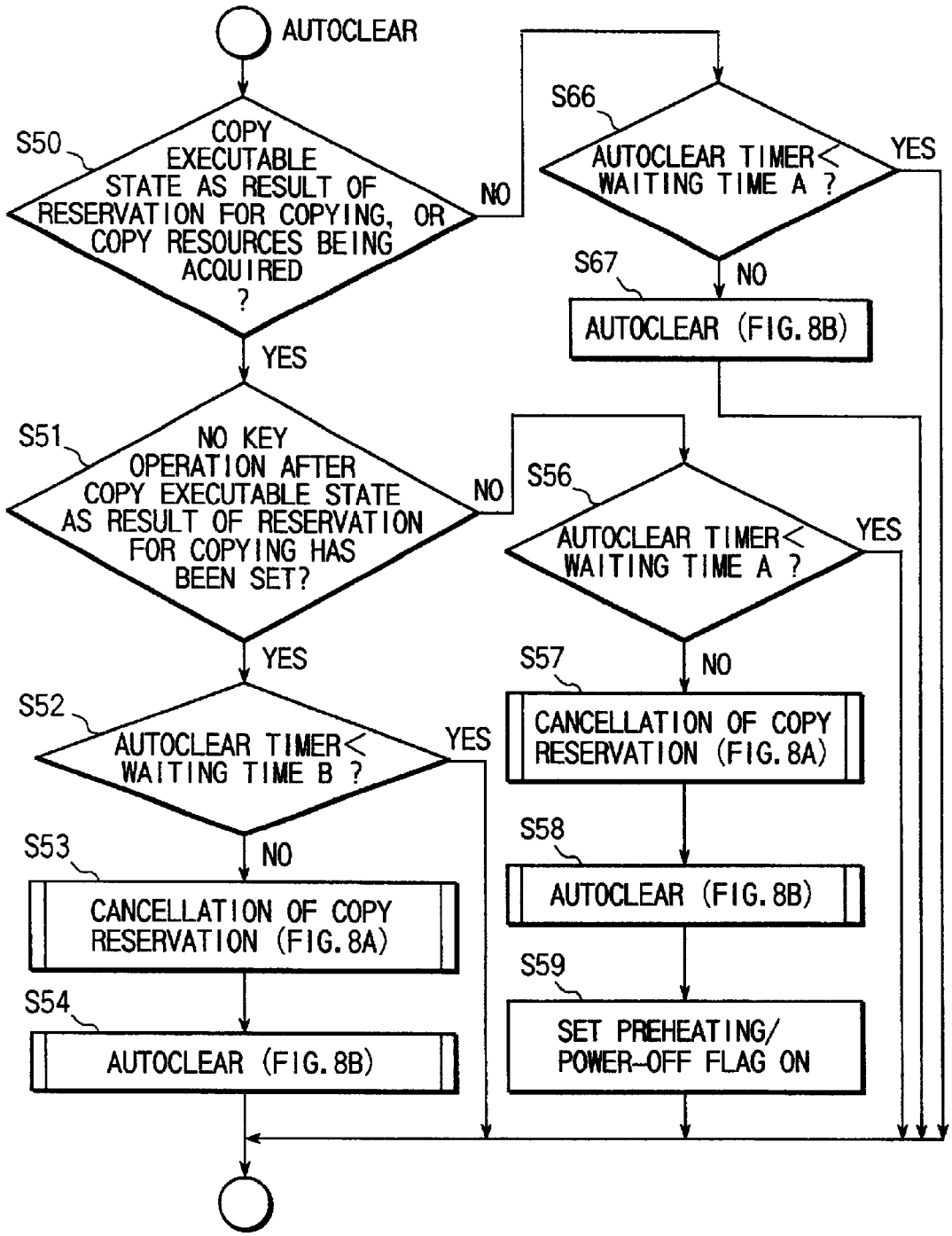
FIG. 7 is a flowchart explaining in detail the autoclear processing of the present invention of FIG. 3.

FIG. 7 is a flowchart for the autoclear operation according to the present invention. If, when a reservation for copying has been made and the copying resources have been secured with success, no copying is performed for a long time with the resources kept, then the printer controller 99 will unfavorably become disabled from performing printer jobs. However, if the copying resources are released just because the control panel 80 was not touched during the fixed period of time after acquisition of the resources, this will be unfavorable for, for example, a case where the user who has made a reservation for copying leaves the copying machine for some reason and returns there with some delay. In the present apparatus, therefore, in addition to the normal autoclear time (standby time A) the autoclear time (standby time B) for the case where no key operation is performed after the copying resources are secured as a result of a reservation for copying is stored in the nonvolatile memory 94. The standby time B includes infinite time (no autoclear is performed), the aforementioned printer job termination scheduled time, the scheduled time plus a fixed time, and a fixed time since the termination of the current printer job.

That is, when no key operation is performed after the copying executable state has been established as a result of a reservation for copying as in step S51 of FIG. 7, the job management task 133 makes a comparison between the contents of the autoclear timer and the standby time B (a constant value) in step S52. When the standby time B has been passed, that is, when the contents of the autoclear timer are greater (NO in step S52), the copying reservation is canceled in step S53 (see FIG. 8A) and then the autoclear is carried out in step S54 (see FIG. 8B).

When NO in step S51 (copying has been performed or a copying function-related key operation has been performed), the job management task 133 makes a comparison between the contents of the autoclear timer and the standby time A (a constant value) in step S52. When the contents of the autoclear timer are greater (NO in step S56), the copying reservation is canceled in step S57 (see FIG. 8A) and then the autoclear is carried out in step S58 (see FIG. 8B). Further, in step S59, the preheating/power-off flag 133d is returned to the ON state. When the ON state of the preheating/power-off flag 133d lasts for a predetermined time, the apparatus enters the preheated state or power-OFF state in order to save the power. The operations in steps S66 and S67 are the same as in conventional copying machines.

With the conventional copying machines, when a jam has occurred in the paper feed during copying, no autoclear will be performed even if the control panel is not touched for a fixed period of time. However, this is unfavorable for the inventive apparatus because a printer job spooled on the printer controller 99 becomes unable to be initiated forever. If the autoclear function were therefore performed in the inventive apparatus, then there would arise the possibility that settings, such as the number of copies, may become invalid while the user is removing errors (e.g., paper jamming). This would also be unfavorable for the copying apparatus.

Figures 8A, 8B:
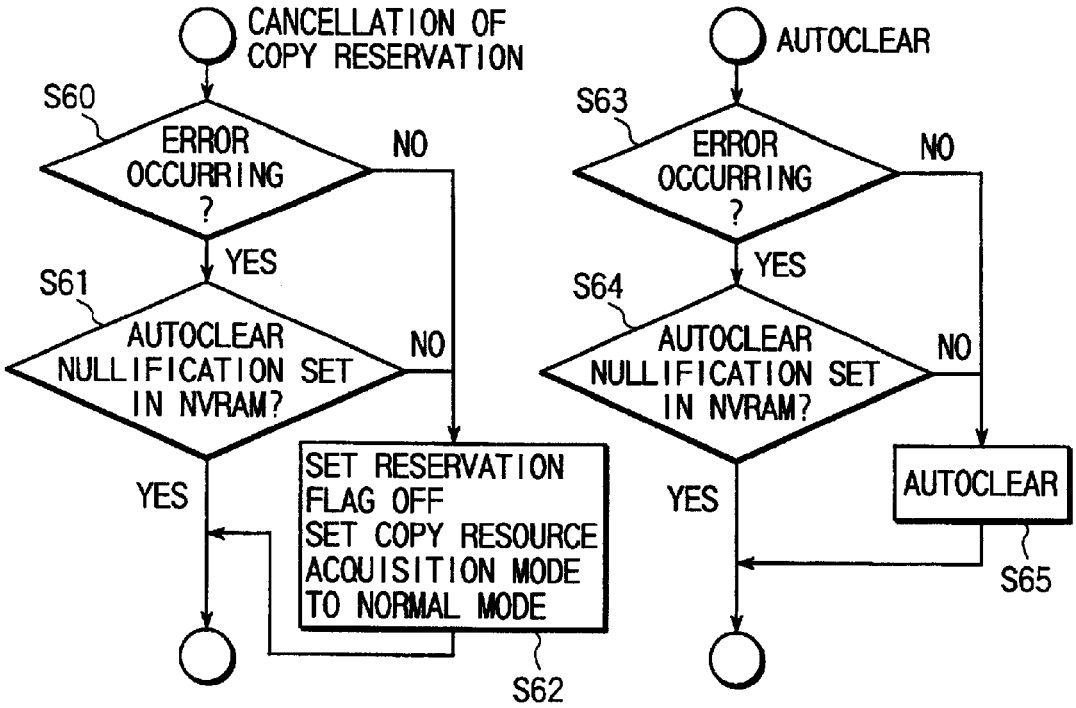
FIG. 8A is a flowchart explaining in detail the cancellation processing of the copy reservation of FIG. 7.
FIG. 8B is a flowchart explaining in detail the autoclear processing of FIG. 7.

In the present apparatus, therefore, whether the autoclear function is to be put into effect or not at the occurrence of errors is set in the table area 94a of the nonvolatile memory 94 in order to allow the user to decide whether to perform the autoclear function or not depending on the use environment. As shown in FIG. 8B, reference is made to the table area 94a to check whether errors are occurring at the time of autoclear or whether the autoclear function has been set to become ineffective during the occurrence of errors (steps S63 and S64). When both the conditions are satisfied, the control is performed in such a way that the autoclear function is not performed. In the case of copy reservation as well, reference is made to the table area 94a to check whether errors are occurring at the timing of autoclear or whether the autoclear function has been set to become ineffective during the occurrence of errors (steps S60 and S61). When both the conditions are satisfied, the control is performed such that the copy reservation is not canceled.

In recent years, the demand for power-saving apparatuses is increasing. Therefore, not a few copying machine have an automatic preheating function of turning off the power to part of the apparatus or an automatic power-off function of turning off the power to all the apparatus when no operation is performed for a fixed period of time. As described previously, a reservation for copying is canceled when no operation is performed for a fixed period of time even if copying has been made possible. In that case, it is expected that a copy job will occur soon. When copy reservation is canceled, the automatic preheating function and the automatic power-off function, even if they have been rendered effective, are made ineffective temporarily. This is carried out, as indicated in step S31 of FIG. 5, by setting the preheating and power-off parameters OFF when a reservation for copying has been accepted. Thus, the present apparatus will not enter the preheated or power-off state.

Moreover, when the copying resources are available after a copy reservation has been made, it may be sometimes desired to work the printer. To this end, as shown in (d) of FIG. 9, a copy reservation cancel button 12 may be left on the control panel while the printer job, which has started before the copying is reserved, is being executed or the copy executable state based on copy reservation. In this case, the copy reservation can be canceled by the user clicking that button.

Figure 6:
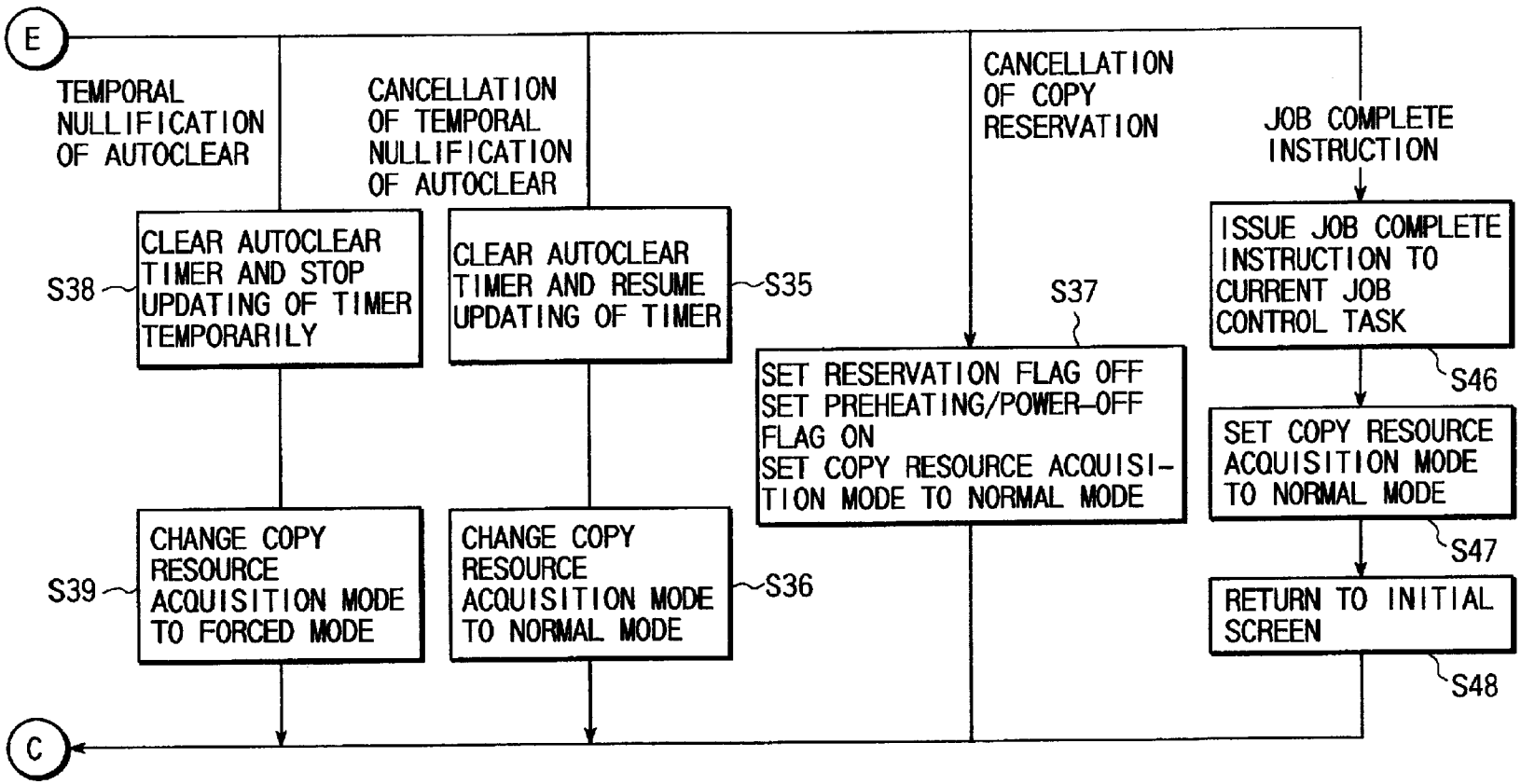
FIG. 6 is a third flowchart for the copy processing of the present invention.

In order to enhance the operability of the copying apparatus for the user who has to leave the apparatus temporarily owing to unavoidable circumstances rather than apparatus errors, a function is provided which temporarily inhibits a printer job by the printer controller 99. This is realized by provided an autoclear negation key 13 on the control panel 80 as shown in (d) of FIG. 9 and depressing that key. In this case, autoclear negation and printer job negation commands are issued from the user IF task 130 and the same control as at the occurrence of errors is performed as indicated in steps S38 and S39 of FIG. 6. The setting of negation can be canceled as in step S35 and S36 by operating an autoclear negation cancel key (not shown) on the control panel 80.

According to the present invention, as described in detail above, a copying apparatus having at least copying and printer functions is provided which allows the user to make a reservation for copying when the printer is in operation and, even in the case where a printer job has been spooled, to use the copying function after the termination of the current printer job. In addition, making a reservation for the copying function will not cause a printer job to be suspended longer than is necessary. Furthermore, even in the case where a copy reservation has been made, it is possible to control power consumption in an efficient manner.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image formation apparatus comprising:

image formation means for forming an image corresponding to input image data;

printer job control means having means for receiving a printer job from external equipment, means for holding a received printer job, means for providing first image data corresponding to the printer job and means for printing an image corresponding to the first image data using the image formation means;

original reading means for optically reading the image of an original to provide second image data;

user interface means for accepting from a user a copy job start input and a copy reservation input for, when the image formation means is being used by the printer control means, making a reservation for the use of a copying function provided by the image formation means and the original reading means after the completion of a printer job in execution;

copy job management means including means responsive to the copy job start input accepted by the user interface means for copying the original image using the original reading means and the image formation means, and copy reservation means responsive to the copy reservation input accepted by the user interface means for reserving the use of the copying function after the completion of the printer job in execution, wherein the copy job management means includes means for inhibiting the execution of a printer job, even if it has occurred, for a time interval from the time at which the image formation means is made available owing to a copy reservation through the copy reservation means to the time which is the sum of the completion scheduled time of a printer job which was in execution at the time of reservation and a [second] predetermined period of time.

2. An image formation apparatus comprising:

image formation means for forming an image corresponding to input image data;

printer job control means having means for receiving a printer job from external equipment, means for holding a received printer job, means for providing first image data corresponding to the printer job and means for printing an image corresponding to the first image data using the image formation means;

original reading means for optically reading the image of an original to provide second image data;

user interface means for accepting from a user a copy job start input and a copy reservation input for, when the image formation means is being used by the printer control means, making a reservation for the use of a copying function provided by the image formation means and the original reading means after the completion of a printer job in execution;

copy job management means including means responsive to the copy job start input accepted by the user interface means for copying the original image using the original reading means and the image formation means, and copy reservation means responsive to the copy reservation input accepted by the user interface means for reserving the use of the copying function after the completion of the printer job in execution, wherein the copy job management means includes means for inhibiting the execution of a printer job, even if it has occurred, for a time interval from the time at which the image formation means is made available owing to a copy reservation through the copy reservation means to the time at which the user interface means accepts [the key inputs] *a key input* at least once.

3. An image formation apparatus comprising:

image formation means for forming an image corresponding to input image data;

printer job control means having means for receiving a printer job from external equipment, means for holding a received printer job, means for providing first image data corresponding to the printer job and means for printing an image corresponding to the first image data using the image formation means;

original reading means for optically reading the image of an original to provide second image data;

user interface means for accepting from a user a copy job start input and a copy reservation input for, when the image formation means is being used by the printer control means, making a reservation for the use of a copying function provided by the image formation means and the original reading means after the completion of a printer job in execution;

copy job management means including means responsive to the copy job start input accepted by the user interface means for copying the original image using the original reading means and the image formation means, and copy reservation means responsive to the copy reservation input accepted by the user interface means for reserving the use of the copying function after the completion of the printer job in execution, wherein the copy job management means includes means for inhibiting the execution of a printer job, even if it has occurred, for a first predetermined period do time since the image formation means was made available owing to a copy reservation through the copy reservation means, and wherein the copy job management means includes printer job inhibit means responsive to an input to the user interface means when the apparatus has been placed in the copy executable state for inhibiting the execution of a printer job by the printer job control means, and the user interface means includes printer job inhibit input means for inhibiting the execution of a printer job and printer job inhibit canceling means for canceling the inhibition of the printer job execution.

4. An image formation apparatus comprising:

image formation means for forming an image corresponding to input image data;

printer job control means having means for receiving a printer job from external equipment, means for holding a received printer job, means for providing first image data corresponding to the printer job and means for printing an image corresponding to the first image data using the image formation means;

original reading means for optically reading the image of an original to provide second image data;

user interface means for accepting from a user a copy job start input and a copy reservation input for, when the image formation means is being used by the printer control means, making a reservation for the use of a copying function provided by the image formation means and the original reading means after the completion of a printer job in execution;

copy job management means including means responsive to the copy job start input accepted by the user interface means for copying the original image using the original reading means and the image formation means, and copy reservation means responsive to the copy reservation input accepted by the user interface means for reserving the use of the copying function after the completion of the printer job in execution, wherein the copy job management means includes means for inhibiting the execution of a printer job, even if it has occurred, for a first predetermined period of time since the image formation means was made available owing to a copy reservation through the copy reservation means, wherein the copy job management means includes means for inhibiting the execution of a printer job, even if it has occurred, for a [third] *second* predetermined period of time since the user interface means accepted [the key inputs] *a key input* at least once after the image formation means was made available owing to a copy reservation through the copy reservation means, and wherein the copy job management means includes power saving means for reducing power consumption of the apparatus by placing the apparatus in the preheat enable state after a lapse of the [third] *second* predetermined period of time the apparatus being placed in the preheated state after a [fourth] *third* predetermined period of time.

5. An image formation apparatus comprising:

image formation means for forming an image corresponding to input image data;

printer job control means having means for receiving a printer job for external equipment, means for holding a received printer job, means for providing first image data corresponding to the printer job and means for printing an image corresponding to the first image data using the image formation means;

original reading means for optically reading the image of an original to provide second image data;

user interface means for accepting from a user a copy job start input and a copy reservation input for, when the image formation means is being used by the printer control manes, making a reservation for the use of a copying function provided by the image formation means and the original reading means after the completion of a printer job in execution;

copy job management means including means responsive to the copy job start input accepted by the user interface means for copying the original image using the original reading means and the image formation means, and copy reservation means responsive to the copy reservation input accepted by the user interface means for reserving the use of the copying function after the completion of the printer job in execution, wherein the copy job management means includes means for inhibiting the execution of a printer job, even if it has occurred, for a first predetermined period of time since the image formation means was made available owing to a copy reservation through the copy reservation means, wherein the copy job management means includes means for inhibiting the execution of a printer job, even if it has occurred, for a [third] *second* predetermined period of time since the user interface means accepted [the key inputs] *a key input* at least once after the image formation means was made available owing to a copy reservation through the copy reservation means, and wherein the copy job management means includes power saving means for reducing power consumption of the apparatus by placing the apparatus in the power-off enable state after a lapse of the [third] *second* predetermined period of time the apparatus being placed in the [power-oft] *power-off* state after a [fourth] *third* predetermined period of time.

6. An image formation apparatus comprising:

image formation means for forming an image corresponding to input image data;

printer job control means having means for receiving a printer job from external equipment, means for holding a received printer job, means for providing first image data corresponding to the printer job and means for printing an image corresponding to the first image data using the image formation means;

original reading means for optically reading the image of an original to provide second image data;

user interface means for accepting from a user a copy job start input and a copy reservation input for, when the image formation means is being used by the printer conrol means, making a reservation for the use of a copying function provided by the image formation means and the original reading means after the completion of a printer job in execution;

copy job management means including means responsive to the copy job start input accepted by the user interface means for copying the original image using the original reading means and the image formation means, and copy reservation means responsive to the copy reservation input accepted by the user interface means for reserving the use of the copying function after the completion of the printer job in execution, wherein the copy job management means includes means for inhabiting the execution of a printer job, even if it has occurred, for a first predetermined period of time since the image formation means was made available owing to a copy reservation through the copy reservation means, wherein the copy job management means includes reservation cancel means responsive to an input to the user interface means when the apparatus has been placed in the copy reserved state by the copy reservation means for canceling the copy reservation, and the user interface means includes reservation cancel input means for canceling the copy reservation.

7. An image formation method for use with an image formation apparatus having a printer unit and a scanner unit comprising:

a printer job control step of receiving a printer job from external equipment and printing an image corresponding to the printer job using the printer unit;

a user interface step of accepting from a user key inputs which include a copy reservation input for, when the printer unit is being used by the printer job control step, making a reservation for the use of a copying function provided by the printer unit and the scanner unit after the completion of a printer job in execution; and a copy job management step including a substep of copying the image of an original using the scanner unit and the printer unit in response to a copy job start input from the user in the user interface step, and a substep of reserving the use of the copying function after the completion of the printer job in execution in response to the copy reservation input in the user interface step, wherein the copy job management step includes a substep of inhibiting the execution of a printer job, even if it has occurred, for a time interval from the time at which the printer unit is made available owing to a copy reservation in the copy reservation substep to the time which is the sum of the completion scheduled time of a printer job which was in execution at the time of reservation and a [second] predetermined period of time.

8. An image formation method for use with an image formation apparatus having a printer unit and a scanner unit comprising:

a printer job control step of receiving a printer job from external equipment and printing an image corresponding to the printer job using the printer unit;

a user interface set of accepting from a user key inputs which include a copy reservation input for, when the printer unit is being used by the printer job control step, making a reservation for the use of a copying function provided by the printer unit and the scanner unit after the completion of a printer job in execution; and a copy job management set including a substep of copying the image of an original using the scanner unit and the printer unit in response to a copy job start input from the user in the user interface step, and a substep of reserving the use of the copying function after the completion of the printer job in execution in response to the copy reservation input n the user interface step, wherein the copy job management step includes a substep of inhibiting the execution of a printer job, even if it has occurred, for a time interval from the time at which the printer unit is made available owing to a copy reservation in the copy reservation substep to the time at which the key inputs are accepted at least once in the user interface step.

9. An image formation method for use with an image formation apparatus having a printer unit and a scanner unit comprising:

a printer job control step of receiving a printer job from external equipment and printing an image corresponding to the printer job using the printer unit;

a user interface step of accepting from a user key inputs which include a copy reservation input for, when the printer unit is being used by the printer job control step, making a reservation for the use of a copying function provided by the printer unit and the scanner unit after the completion of a printer job in execution; and a copy job management step including a substep of copying the image of an original using the scanner unit and the printer unit in response to a copy job start input from the user in the user interface step, and a substep of reserving the use of the copying function after the completion of the printer job in execution in response to the copy reservation input in the user interface step, wherein the copy job management step includes a substep of inhibiting the execution of a printer job, even if it has occurred, for a first predetermined period of time since the printer unit was made available owing to a copy reservation in the copy reservation substep, and wherein the copy job management step includes a printer job inhibit substep of inhibiting the execution of a printer job in the printer job control step in response to an input to the user interface step when the apparatus has been placed in the copy executable state.

10. An image formation method for use with an image formation apparatus having a printer unit and a scanner unit comprising:

a printer job control step of receiving a printer job from external equipment and printing an image corresponding to the printer job using the printer unit;

a user interface step of accepting from a user key inputs which includes a copy reservation input for, when the printer unit is being used by the printer job control step, making a reservation for the use of a copying function provided by the printer unit and the scanner unit after the completion of a printer job in execution; and a copy job management step including a substep of copying the image of an original using the scanner unit and the printer unit in response to a copy job start input from the user in the user interface step, and a substep of reserving the use of the copying function after the completion of the printer job in execution in response to the copy reservation input in the user interface step, wherein the copy job management step includes a substep of inhibiting the execution of a printer job, even if it has occurred, for a first predetermined period of time since the printer unit was made available owing to a copy reservation in the copy reservation substep, and wherein the copy job management step includes a reservation cancel substep of canceling the copy reservation in response to an input in the user interface step when the printer unit and scanner unit have been placed in the copy reserved state through the copy reservation substep.

*11. The image forming apparatus as recited in claim 2, wherein the copy job management means includes a copy reservation cancel means for canceling the reserving of the use of the copying function when the user interface means does not accept an input from the user for a predetermined period of time after the image forming means is made available owing to the copy reservation through the copy reservation means.*

*12. The image forming apparatus as recited in claim 11, wherein the copy job management means includes an autoclear means for performing an autoclear function for initializing settings of the image forming apparatus when the copy reservation has been canceled.*

*13. The image forming method as recited in claim 8, wherein the copy job management step includes a copy reservation cancel substep for canceling the reserving of the use of the copying function when user key inputs are not accepted for a predetermined period of time after the printer unit is made available owing to the copy reservation in the copy reservation substep.*

*14. The image forming method as recited in claim 13, wherein the copy job management step includes an autoclear step for performing an autoclear function for initializing settings of the image forming apparatus when the copy reservation has been canceled.*

*15. An image forming apparatus comprising:*

*image formation means for forming an image corresponding to input image data;*

*printer job control means having means for receiving a printer job from external equipment, means for holding a received printer job, means for providing first image data corresponding to the printer job and means for printing an image corresponding to the first image data using the image formation means;*

*original reading means for optically reading the image of an original to provide second image data;*

*user interface means for accepting from a user a copy job start input and a copy reservation input for, when the image formation means is being used by the printer control means, making a reservation for the use of a copying function provided by the image formation means and the original reading means after the completion of a printer job in execution;*

*copy job management means including means responsive to the copy job start input accepted by the user interface means for copying the original image using the original reading means and the image formation means, and copy reservation means responsive to the copy reservation input accepted by the user interface means for reserving the use of the copying function after the completion of the printer job in execution,*

*wherein the copy job management means includes means for inhibiting the execution of a printer job, even if the print job has been received from said external equipment, for a time interval from the time at which the image formation means is made available owing to a copy reservation through the copy reservation means to the time which is the sum of the completion scheduled time of a printer job which was in execution at the time of reservation and a second predetermined period of time.*

*16. An image formation apparatus comprising:*

*image formation means for forming an image corresponding to input image data;*

*printer job control means having means for receiving a printer job from external equipment, means for holding a received printer job, means for providing first image data corresponding to the printer job and means for printing an image corresponding to the first image data using the image formation means;*

*original reading means for optically reading the image of an original to provide second image data;*

*user interface means for accepting from a user a copy job start input and a copy reservation input for, when the image formation means is being used by the printer control means, making a reservation for the use of a copying function provided by the image formation means and the original reading means after the completion of a printer job in execution;*

*copy job management means including means responsive to the copy job start input accepted by the user interface means for copying the original image using the original reading means and the image formation means, and copy reservation means responsive to the copy reservation input accepted by the user interface means for reserving the use of the copying function after the completion of the printer job in execution,*

*wherein the copy job management means includes means for inhibiting the execution of a printer job, even if the print job has been received from said external equipment, for a time interval from the time at which the image formation means is made available owing to a copy reservation through the copy reservation means to the time at which the user interface means accepts the start input.*

*17. The image forming apparatus as recited in claim 16, wherein the copy job management means includes a copy reservation cancel means for canceling the reserving of the use of the copying function when the user interface means does not accepted an input from the user for a predetermined period of time after the image forming means is made available owing to the copy reservation through the copy reservation means.*

*18. The image forming apparatus as recited in claim 17, wherein the copy job management means includes an autoclear means for performing an autoclear function for initializing settings of the image forming apparatus when the copy reservation has been canceled.*

*19. An image formation apparatus comprising:*

*image formation means for forming an image corresponding to input image data;*

*printer job control means having means for receiving a printer job from external equipment, means for holding*

*a received printer job, means for providing first image data corresponding to the printer job and means for printing an image corresponding to the first image data using the image formation means;*

*original reading means for optically reading the image of an original to provide second image data;*

*user interface means for accepting from a user a copy job start input and a copy reservation input for, when the image formation means is being used by the printer control means, making a reservation for the use of a copying function provided by the image formation means and the original reading means after the completion of a printer job in execution;*

*copy job management means including means responsive to the copy job start input accepted by the user interface means for copying the original image using the original reading means and the image formation means, and copy reservation means responsive to the copy reservation input accepted by the user interface means for reserving the use of the copying function after the completion of the printer job in execution,*

*wherein the copy job management means includes means for inhibiting the execution of a printer job, even if the print job has been received from said external equipment, for a first predetermined period of time since the image formation means was made available owing to a copy reservation through the copy reservation means, and*

*wherein the copy job management means includes printer job inhibit means responsive to an input to the user interface means when the apparatus has been placed in the copy executable state for inhibiting the execution of a printer job by the printer job control means, and the use interface means includes printer job inhibit input means for inhibiting the execution of a printer job and printer job inhibit canceling means for canceling the inhibition of the printer job execution.*

*20. An image formation apparatus comprising:*

*image formation means for forming an image corresponding to input image data;*

*printer job control means having means for receiving a printer job from external equipment, means for holding a received printer job, means for providing first image data corresponding to the printer job and means for printing an image corresponding to the first image data using the image formation means;*

*original reading means for optically reading the image of an original to provide second image data;*

*user interface means for accepting from a user a copy job state input and a copy reservation input for, when the image formation means is being used by the printer control means, making a reservation for the use of a copying function provided by the image formation means and the original reading means after the completion of a printer job in execution;*

*copy job management means including means responsive to the copy job start input accepted by the user interface means for copying the original image using the original reading means and the image formation means, and copy reservation means responsive to the copy reservation input accepted by the user interface means for reserving the use of the copying function after the completion of the printer job in execution,*

*wherein the copy job management means includes means for inhibiting the execution of a printer job, even if the print job has been received from said external equipment, for a first predetermined period of time since the image formation means was made available owing to a copy reservation through the copy reservation means,*

*wherein the copy job management means includes means for inhibiting the execution of a printer job, even if the print job has been received from said external equipment, for a second predetermined period of time after the user interface means accepted a key input, and*

*wherein the copy job management means includes power saving means for reducing power consumption of the apparatus by placing the apparatus in the preheat enable state after a lapse of said second predetermined period of time, the apparatus being placed in the preheated state after a third predetermined period of time.*

*21. An image formation apparatus comprising:*

*image formation means for forming an image corresponding to input image data;*

*printer job control means having means for receiving a printer job from external equipment, means for holding a received printer job, means for providing first image data corresponding to the printer job and means for printing an image corresponding to the first image data using the image formation means;*

*original reading means for optically reading the image of an original to provide second image data;*

*user interface means for accepting from a user a copy job start input and a copy reservation input for, when the image formation means is being used by the printer control means, making a reservation for the use of a copying function provided by the image formation means and the original reading means after the completion of a printer job in execution;*

*copy job management means including means responsive to the copy job start input accepted by the user interface means for copying the original image using the original reading means and the image formation means, and copy reservation means responsive to the copy reservation input accepted by the user interface means for reserving the use of the copying function after the completion of the printer job in execution,*

*wherein the copy job management means includes means for inhibiting the execution of a printer job, even if the print job has been received from said external equipment, for a first predetermined period of time since the image formation means was made available owing to a copy reservation through the copy reservation means,*

*wherein the copy job management means includes means for inhibiting the execution of a printer job, even if the print job has been received from said external equipment, for a second predetermined period of time since the user interface means accepted a key input at least once after the image formation means was made available owing to a copy reservation through the copy reservation means, and*

*wherein the copy job management means includes power saving means for reducing power consumption of the apparatus by placing the apparatus in the power-off enable state after a lapse of the second predetermined period of time the apparatus being placed in the power-off state after a third predetermined period of time.*

*22. An image formation apparatus comprising:*

*image formation means for forming an image corresponding to input image data;*

*printer job control means having means for receiving a printer job from external equipment, means for holding a received printer job, means for providing first image data corresponding to the printer job and means for printing an image corresponding to the first image data using the image formation means;*

*original reading means for optically reading the image of an original to provide second image data;*

*user interface means for accepting from a user a copy job start input and a copy reservation input for, when the image formation means is being used by the printer control means, making a reservation for the use of a copying function provided by the image formation means and the original reading means after the completion of a printer job in execution;*

*copy job management means including means responsive to the copy job start input accepted by the user interface means for copying the original image using the original reading means and the image formation means, and copy reservation means responsive to the copy reservation input accepted by the user interface means for reserving the use of the copying function after the completion of the printer job in execution,*

*wherein the copy job management means include means for inhibiting the execution of a printer job, even if the print job has been received from said external equipment, for a first predetermined period of time since the image formation means was made available owing to a copy reservation through the copy reservation means,*

*wherein the copy job management means includes reservation cancel means responsive to an input to the user interface means when the apparatus has been placed in the copy reserved state by the copy reservation means for canceling the copy reservation, and the user interface means includes reservation cancel input means for canceling the copy reservation.*

*23. An image formation method for use with an image formation apparatus having a printer unit and a scanner unit comprising:*

*a printer job control step of receiving a printer job from external equipment and printing an image corresponding to the printer job using the printer unit;*

*a user interface step of accepting from a user key inputs which include a copy reservation input for, when the printer unit is being used by the printer job control step, making a reservation for the use of a copying function provided by the printer unit and the scanner unit after the completion of a printer job in execution; and*

*a copy job management step including a substep of copying the image of an original using the scanner unit and the printer unit in response to a copy job start input from the user in the interface step, and a substep of reserving the use of the copying function after the completion of the printer job in execution in response to the copy reservation input in the user interface step,*

*wherein the copy job management step includes a substep of inhibiting the execution of a printer job, even if the print job has been received from said external equipment, for a time interval from the time at which the printer unit is made available owing to a copy reservation in the copy reservation substep to the time which is the sum of the completion scheduled time of a printer job which was in execution at the time of reservation and a second predetermined period of time.*

*24. An image formation method for use with an image formation apparatus having a printer unit and a scanner unit comprising:*

*a printer job control step of receiving a printer job from external equipment and printing an image corresponding to the printer job using the printer unit;*

*a user interface set of accepting from a user key inputs which include a copy reservation input for, when the printer unit is being used by the printer job control step, making a reservation for the use of a copying function provided by the printer unit and the scanner unit after the completion of a printer job in execution; and*

*a copy job management step including a substep of copying the image of an original using the scanner unit and the printer unit in response to a copy job start input from the user in the user interface step, and a substep of reserving the use of the copying function after the completion of the printer job in execution in response to the copy reservation input in the user interface step,*

*wherein the copy job management step includes a substep of inhibiting the execution of a printer job, even if the printer job has been received from said external equipment, for at least a time interval from the time at which the printer unit is made available owing to a copy reservation in the copy reservation substep to the time at which the key inputs are accepted at least once in the user interface step.*

*25. The image formation method as recited in claim 24, wherein the copy job management step includes a copy reservation cancel substep for canceling the reserving of the use of the copying function when user key inputs are not accepted for a predetermined period of time after the printer unit is made available owing to the copy reservation in the copy reservation substep.*

*26. The image forming method as recited in claim 25, wherein the copy job management step includes an autoclear step for performing an autoclear function for initializing settings of the image forming apparatus when the copy reservation has been canceled.*

*27. An image formation method for use with an image formation apparatus having a printer unit and a scanner unit comprising:*

*a printer job control step of receiving a printer job from external equipment and printing an image corresponding to the printer job using the printer unit;*

*a user interface step of accepting from a user key inputs which include a copy reservation input for, when the printer unit is being used by the printer job control step, making a reservation for the use of a copying function provided by the printer unit and the scanner unit after the completion of a printer job in execution; and*

*a copy job management step including a substep of copying the image of an original using the scanner unit and the printer unit in response to a copy job start input from the user in the user interface step, and a substep of reserving the use of the copying function after the completion of the printer job in execution in response to the copy reservation input in the user interface step,*

*wherein the copy job management step includes a substep of inhibiting the execution of a printer job, even if the print job has been received from said external equipment, for a first predetermined period of time since the printer unit was made available owing to a copy reservation in the copy reservation substep, and*

*wherein the copy job management step includes a printer job inhibit substep of inhibiting the execution of a printer job in the printer job control step in response to an input to the user interface step when the apparatus has been placed in the copy executable state.*

*28. An image formation method for use with an image formation apparatus having a printer unit and a scanner unit comprising:*

*a printer job control step of receiving a printer job from external equipment and printing an image corresponding to the printer job using the printer unit;*

*a user interface step of accepting from a user key inputs which include a copy reservation input for, when the printer unit is being used by the printer job control step, making a reservation for the use of a copying function provided by the printer unit and the scanner unit after the completion of a printer job in execution; and*

*a copy job management step including a substep of copying the image of an original using the scanner unit and the printer unit in response to a copy job start input from the user in the user interface step, and a substep of reserving the use of the copying function after the completion of the printer job in execution in response to the copy reservation input in the user interface step,*

*wherein the copy job management step includes a substep of inhibiting the execution of a printer job, even if the print job has been received from said external equipment, for a first predetermined period of time since the printer unit was made available owing to a copy reservation in the copy reservation substep, and*

*wherein the copy job management step includes a reservation cancel substep of canceling the copy reservation in response to an input in the user interface step when the printer unit and scanner unit have been placed in the copy reserved state through the copy reservation substep.*

* * * * *